US012662594B2

(12) United States Patent
Xiao et al.

(10) Patent No.: US 12,662,594 B2
(45) Date of Patent: Jun. 23, 2026

(54) FLUORINE-FREE FLAME-RETARDANT RECLAIMED PC/ABS MATERIAL AND PREPARATION METHOD THEREOF

(71) Applicant: Guangdong Guoheng Youhe Advanced Materials Co., Ltd., Dongguan (CN)

(72) Inventors: Gaoji Xiao, Dongguan (CN); Xiangmeng Zhang, Dongguan (CN); Jinbiao Huang, Dongguan (CN)

(73) Assignee: Guangdong Guoheng Youhe Advanced Materials Co., Ltd., Dongguan (CN)

( * ) Notice: Subject to any disclaimer, the term of this patent is extended or adjusted under 35 U.S.C. 154(b) by 0 days.

(21) Appl. No.: 19/305,849

(22) Filed: Aug. 21, 2025

(65) Prior Publication Data

US 2026/0055270 A1     Feb. 26, 2026

(30) Foreign Application Priority Data

Aug. 26, 2024     (CN) .......................... 202411175205.3

(51) Int. Cl.
| | |
|---|---|
| *C08L 69/00* | (2006.01) |
| *C08K 5/06* | (2006.01) |
| *C08K 5/10* | (2006.01) |
| *C08K 5/5419* | (2006.01) |

(52) U.S. Cl.
CPC ................ *C08L 69/00* (2013.01); *C08K 5/06* (2013.01); *C08K 5/10* (2013.01); *C08K 5/5419* (2013.01); *C08L 2201/02* (2013.01); *C08L 2207/20* (2013.01)

(58) Field of Classification Search
None
See application file for complete search history.

(56) References Cited

FOREIGN PATENT DOCUMENTS

| CN | 116554668 A | * | 8/2023 | .............. C08L 69/00 |
| CN | 118931145 A | * | 11/2024 | .............. C08L 69/00 |

OTHER PUBLICATIONS

English Machine translation of CN118931145 taken from the European Patent Office in Nov. 2025 (Year: 2024).*
English Machine Translation CN116554668 taken from the European Patent Office in Nov. 2025 (Year: 2023).*

* cited by examiner

*Primary Examiner* — Arrie L Reuther
*Assistant Examiner* — Devin Mitchell Darling
(74) *Attorney, Agent, or Firm* — Cooper Legal Group, LLC

(57)     ABSTRACT

A fluorine-free flame-retardant reclaimed PC/ABS material and a preparation method thereof. The fluorine-free flame-retardant reclaimed PC/ABS material is prepared from the following raw materials in percent by weight: 50%-85% of a modified recycled PC/ABS material, 2.5%-25% of a reinforcing resin, 3%-15% of a compatibilizer, 4%-9% of a flame retardant, 0.2%-4% of a lubricant, and 0.3%-2% of an antioxidant. The flame retardant consists of an organic phosphorus flame retardant and a phosphazene flame retardant. The modified recycled PC/ABS material is prepared from a recycled PC material, a recycled ABS material, a styrene-epoxy group copolymer, pentaerythritol triallyl ether, a silane coupling agent, and ester gum. A method for preparing the fluorine-free flame-retardant reclaimed PC/ABS material includes: raw material mixing, melt extrusion, and cooling and granulation. The fluorine-free flame-retardant reclaimed PC/ABS material prepared by the present application has good flame retardancy, wave transmission, impact resistance and fatigue resistance.

5 Claims, No Drawings

FLUORINE-FREE FLAME-RETARDANT RECLAIMED PC/ABS MATERIAL AND PREPARATION METHOD THEREOF

CROSS-REFERENCE TO RELATED APPLICATION

The present application claims the priority and benefit of Chinese patent application No. 202411175205.3, filed on Aug. 26, 2024. The entirety of Chinese patent application No. 202411175205.3 is hereby incorporated by reference herein and made a part of this specification.

TECHNICAL FIELD

The present application relates to the field of reclaimed plastic materials and, more particularly, to a fluorine-free flame-retardant reclaimed PC/ABS material and a preparation method thereof.

BACKGROUND OF THE INVENTION

PC/ABS material is a widely used plastic material and can be used in electronic components, electronic product casings, household appliances, sports equipment, interior and exterior trims of automobiles and other industries. A large amount of waste materials are produced during the production and consumption process of the PC/ABS material. If these waste materials are directly discarded or landfilled, it will cause serious pollution to the environment. In order to improve the utilization efficiency of waste materials, more and more companies will recycle these waste materials to reduce production costs, save energy, and reduce carbon emissions. The recycled waste materials are often called recycled PC/ABS materials.

During the use and reprocessing of recycled PC/ABS materials, the molecular chain may be damaged, causing a reduction in the physical properties of recycled PC/ABS materials, such as tensile strength, bending strength, and aging resistance. Recycled PC/ABS materials contain a large number of impurities, such as compatibilizers, toughening resins, and fillers, which will also reduce the use performance of recycled PC/ABS materials. The above problems increase the processing difficulty of recycled PC/ABS materials and reduce the use performance of the recycled PC/ABS materials. In the prior art, in order to improve the mechanical properties of recycled PC/ABS materials, the recycled PC/ABS materials are modified by means of further adding additives such as fillers, toughening resins and compatibilizers to the recycled PC/ABS materials. The additives improve the mechanical properties of the recycled PC/ABS materials to a certain extent so that the recycled PC/ABS materials can meet requirements for use in general application scenarios, such as home electronic product casings and interior and exterior trims of automobiles.

However, when the recycled PC/ABS materials described above are used in highly demanding communication devices such as 5G antenna casings, the recycled PC/ABS materials are required to have good mechanical properties and aging resistance and also have good flame retardancy and electromagnetic wave transmission, to meet the needs of use. In order to improve the flame retardancy of recycled PC/ABS materials, the addition of flame-retardant fillers is required. Conventional flame-retardant fillers are generally flame-retardant powders containing fluorine or other halogens. Generally, a good flame-retardant effect can be achieved by adding a very small amount of the conventional flame-retardant fillers. However, such flame retardants are less environmentally friendly. There are also some more environmentally friendly flame retardants, such as antimony trioxide, magnesium hydroxide and aluminum hydroxide, and these flame retardants need to be added in a large amount to achieve better flame retardant effect. However, the addition of a large amount of flame retardants will reduce the resistance of the 5G antenna casings against external mechanical forces such as wind pressure, vibration and impact, and also reduce the fatigue resistance of the 5G antenna casings in long-term use. In addition, the addition of a large amount of flame retardants will further hinder the electromagnetic wave transmission of the 5G antenna casings and reduce the signal transmission stability of 5G communication equipment, thus reducing the use performance of the recycled PC/ABS materials in highly demanding communication devices, such as 5G antenna casings.

SUMMARY

In order to solve the existing technical problems described above, the present application provides a fluorine-free flame retardant PC/ABS reclaimed material and a preparation method thereof.

In a first aspect, the present application provides a fluorine-free flame-retardant reclaimed PC/ABS material and adopts the following technical solutions:

A fluorine-free flame-retardant reclaimed PC/ABS material, being prepared from the following raw materials in percent by weight:

50%-85% of a modified recycled PC/ABS material,
2.5%-25% of a reinforcing resin,
3%-15% of a compatibilizer,
4%-9% of a flame retardant,
0.2%-4% of a lubricant, and
0.3%-2% of an antioxidant;

the flame retardant consists of an organic phosphorus flame retardant and a phosphazene flame retardant;

the modified recycled PC/ABS material is prepared from a recycled PC material, a recycled ABS material, a styrene-epoxy group copolymer, pentaerythritol triallyl ether, a silane coupling agent and ester gum.

According to the above technical solution, in the fluorine-free flame-retardant reclaimed PC/ABS material of the present application, the modified recycled PC/ABS material serves as a material matrix, and the reinforcing resin serves as a performance reinforcing material. In the presence of the compatibilizer, molecular chain segments of the modified recycled PC/ABS material are evenly intertwined and dispersed to form a dense interweaving system, so that the flame retardant is uniformly dispersed in the dense interweaving system. The reclaimed PC/ABS material prepared thereby has good flame retardancy and further has good mechanical strength, fatigue resistance and wave transmission.

The organic phosphorus flame retardant and the phosphazene flame retardant are used as the flame retardant. In terms of flame retardancy, the organic phosphorus flame retardant and the phosphazene flame retardant terminate the combustion chain reaction by capturing free radicals, and refractory gas such as carbon dioxide, ammonia, and nitrogen, produced during decomposition, reduces the concentration of combustible gases and the spread rate of combustible gases. Moreover, phosphoric acid compounds such as phosphoric acid, polyphosphoric acid and metaphosphoric acid produced during combustion promote polymer dehydration to form a carbon layer. Under the synergistic effect of the modified recycled PC/ABS material, excellent flame retardant effect is achieved with a small addition amount of the flame retardant, and the reclaimed PC/ABS material prepared has good flame retardancy and good wave transmission.

The modified recycled PC/ABS material is prepared from the recycled PC material, the recycled ABS material, the styrene-epoxy group copolymer, the pentaerythritol triallyl ether, the silane coupling agent and the ester gum. Due to some molecular chain segments in the recycled PC material and the recycled ABS material being broken and the presence of impurities, the mechanical properties and fatigue resistance of the recycled PC material and the recycled ABS material are reduced, and the aggregation of impurities hinders the electromagnetic wave transmittance of the recycled material. Moreover, the flexible epoxy group present in the molecular chain segments of the styrene-epoxy group copolymer can improve the dispersion uniformity of the recycled PC material and the recycled ABS material. The branched ether structure and the branched vinyl structure of the pentaerythritol triallyl ether are compatible with organic systems such as the recycled PC material and the recycled ABS material. The hydroxyl chain segment of the pentaerythritol triallyl ether can disperse the flame retardant. The ester gum can adequately soften and infiltrate the recycled PC material and the recycled ABS material. The silane coupling agent can further compatibly disperse organic systems and the flame retardant. Under the synergistic effect of the styrene-epoxy group copolymer, the pentaerythritol triallyl ether, the silane coupling agent and the ester gum, the flame retardant is thoroughly dispersed into the interweaving system, and the molecular chain segments of the recycled PC material and the recycled ABS material are interwoven with each other, reducing the agglomeration or uneven dispersion of impurities. The modified recycled PC/ABS material prepared has good mechanical strength and fatigue resistance. The reclaimed PC/ABS material prepared thereby has good flame retardancy and further has good mechanical strength, fatigue resistance and wave transmission and can be used in highly demanding communication devices such as 5G antenna casings.

Preferably, the organic phosphorus flame retardant is a mixture of hydroquinone bis(diphenyl phosphate) and tetraphenylbisphenol A diphosphate, the phosphazene flame retardant is polydiphenyloxyphosphazene, and a weight ratio of the tetraphenylbisphenol A diphosphate to the hydroquinone bis(diphenyl phosphate) to the polydiphenyloxyphosphazene is (1-2):(3-8):(1-3).

According to the above technical solution, the polydiphenoxyphosphazene is used as the phosphazene flame retardant, the nitrogen element and the phosphorus element on the main chain of the polydiphenoxyphosphazene are alternately arranged, and the side chain of the polydiphenoxyphosphazene is phenoxy, good flame retardance and flexibility are provided for the polydiphenyloxy phosphazene. The polydiphenoxyphosphazene can keep stable at high temperatures and promote the formation of the carbon layer. The hydroquinone bis(diphenyl phosphate) and tetraphenylbisphenol A diphosphate are used as the organic phosphorus flame retardant, so that phosphoric acid compounds such as phosphoric acid, polyphosphoric acid and metaphosphoric acid, produced in combustion, can further promote the formation of the carbon layer. Therefore, tetraphenylbisphenol A diphosphate, hydroquinone bis(diphenyl phosphate) and polydiphenyloxy phosphazene which are used in combination in an optimal amount ratio as the flame retardant achieve a good synergistic effect. When added to the modified recycled PC/ABS material, the flame retardant is capable of improving the flame retardancy of the reclaimed PC/ABS material prepared under the synergistic effect of the modified recycled PC/ABS material, the reinforcing resin and the compatibilizer, and the reclaimed PC/ABS material prepared further has good mechanical strength and fatigue resistance, and can maintain good wave transmission.

Preferably, the modified recycled PC/ABS material is prepared from the following raw materials in parts by weight:

60-80 parts of the recycled PC material,
  15-25 parts of the recycled ABS material,
  15-25 parts of the styrene-epoxy group copolymer,
  4-8 parts of the pentaerythritol triallyl ether,
  3-6 parts of the silane coupling agent, and
  2-5 parts of the ester gum.

According to the above technical solution, the styrene-epoxy group copolymer, the pentaerythritol triallyl ether, the silane coupling agent and the ester gum are combined in an optimal amount ratio to enhance the recycled PC material and the recycled ABS material, so that the modified recycled PC/ABS material prepared has good impact resistance and further has good flame retardancy, fatigue resistance and wave transmission.

Preferably, the silane coupling agent consists of Si-69 silane coupling agent and γ-glycidoxypropyltrimethoxysilane in a weight ratio of 1:(0.1-0.3).

According to the above technical solution, the Si-69 silane coupling agent and the γ-glycidoxypropyltrimethoxysilane are combined in an optimal amount ratio. In this way, the mixing homogeneity of the flame retardant and the modified recycled PC/ABS material can be further improved, thereby improving the dispersibility of the flame retardant in the modified recycled PC/ABS material, and enhancing the mechanical properties, flame retardancy and wave transmission of the reclaimed PC/ABS material prepared.

Preferably, the modified recycled PC/ABS material is prepared by the following steps:

A1, separately crushing the recycled PC material and the recycled ABS material, and sifting out the recycled PC material with a particle size of 0.5-5 mm and the recycled ABS material with a particle size of 0.5-5 mm;

A2, performing acid pickling, water washing and drying on a sifted recycled PC material and a sifted recycled ABS material separately to obtain an acid pickled recycled PC material and an acid pickled recycled ABS material; and A3, mixing the acid pickled recycled PC material, the acid pickled recycled ABS material, the styrene-epoxy group copolymer, the pentaerythritol triallyl ether, the silane coupling agent and the ester gum to obtain a mixture and performing melt extrusion, cooling, and cutting on the mixture to obtain the modified recycled PC/ABS material.

According to the above technical solution, the recycled PC material and the recycled ABS material are first crushed and sifted separately. Because the impurity components with low plasticity are easily crushed into small molecular particles under the shearing and collision actions during the crushing process, the recycled PC material with a particle size of less than 0.5 mm and the recycled ABS material with a particle size of less than 0.5 mm need to be sifted out and removed. The recycled PC material with a particle size of greater than 5 mm and the recycled ABS material with a particle size of greater than 5 mm need to be recycled and crushed again so that the particle size meets the standard requirements. Afterwards, the recycled PC material with the particle size of 0.5-5 mm and the recycled ABS material with the particle size of 0.5-5 mm are subjected to acid pickling treatment separately to further remove some impurities out of the recycled PC material and the recycled ABS material; then, the acid pickled recycled PC material and the acid pickled recycled ABS material are mixed and modified to improve the interweaving and dispersion uniformity of the molecular chain segments of the recycled PC material and the recycled ABS material, and enhance the mechanical strength and fatigue resistance of the modified recycled PC/ABS material prepared.

Preferably, the reinforcing resin consists of silicone PC resin and SEBS in a weight ratio of 1:(0.2-0.4).

According to the above technical solution, a polydimethylsiloxane chain segment which is introduced into the silicone PC resin increases the length and electrical stability resistance of the flexible structural units, reduces the rigidity of the benzene ring, and can be interwoven and dispersed with the molecular chain segments of the SEBS. The silicone PC resin and the SEBS produce a good synergistic effect, further improving the dispersion uniformity of the flame retardant in the system and the flame retardancy and wave transmission of the reclaimed PC/ABS material while improving the mechanical strength and fatigue resistance of the reclaimed PC/ABS material.

Preferably, the compatibilizer consists of a glycidyl methacrylate-styrene-acrylonitrile copolymer and a styrene-acrylate copolymer in a weight ratio of 1:(1-3).

According to the above technical solution, the glycidyl methacrylate-styrene-acrylonitrile copolymer and the styrene-acrylate copolymer in an optimal amount ratio produce a synergistic effect, thereby improving the dispersion uniformity of the modified recycled PC/ABS material, the reinforcing resin, the flame retardant and other components and further enhancing the mechanical strength, fatigue resistance, flame retardancy and wave transmission of the reclaimed PC/ABS material prepared.

Preferably, the lubricant is at least one selected from a group consisting of: polydimethylsiloxane, silicone powder, paraffin wax, polyethylene wax, calcium stearate, zinc stearate, stearic acid amide and N, N-ethylene bisstearate amide.

According to the above technical solution, the lubricant described above can better improve the processing flowability and viscosity of the reclaimed PC/ABS material, reduce the friction of components during extrusion molding, and improve processing stability.

Preferably, the antioxidant is at least one of antioxidant 1010 and antioxidant 168.

According to the above technical solution, the above antioxidant can better improve the aging resistance of the reclaimed PC/ABS material prepared.

In a second aspect, the present application provides a method for preparing the fluorine-free flame-retardant reclaimed PC/ABS material and adopts the following technical solutions:

A method for preparing the fluorine-free flame-retardant reclaimed PC/ABS material, including the following steps: mixing the modified recycled PC/ABS material, the reinforcing resin, the compatibilizer, the flame retardant, the lubricant and the antioxidant uniformly to obtain a resulting mixture, and performing melt extrusion, cooling, and cutting on the resulting mixture to prepare the fluorine-free flame-retardant reclaimed PC/ABS material.

According to the above technical solution, the raw materials mentioned above are mixed and then subjected to melt extrusion, cooling, and cutting to obtain the fluorine-free flame-retardant reclaimed PC/ABS material with stable performance.

In summary, the present application has the following beneficial effects:

1. The fluorine-free flame-retardant reclaimed PC/ABS material of the present application has good flame retardancy and further has good mechanical strength, fatigue resistance and wave transmission, and thus can be applied to highly demanding communication devices such as 5G antenna casings.

2. The tetraphenylbisphenol A disphosphate and the hydroquinone bis(diphenyl phosphate) which are used in an optimal amount ratio as the organic phosphorus flame retardant, together with the polydiphenyloxyphosphazene used as the phosphazene flame retardant, produce good synergy and can achieve excellent flame retardant effect at a small amount under the joint action of the modified recycled PC/ABS material, the reinforcing resin and the compatibilizer. The reclaimed PC/ABS material prepared has good mechanical strength and fatigue resistance, and can maintain good wave transmission.

3. According to the present application, the silicone PC resin and the SEBS, which are used in an optimal amount ratio as the reinforcing resin, and the glycidyl methacrylate-styrene-acrylonitrile copolymer and the styrene-acrylate copolymer, which are used in an optimal amount ratio as the compatibilizer, can be better combined with the modified recycled PC/ABS material to improve the flame retardancy and wave transmission of the reclaimed PC/ABS material prepared while enhancing the mechanical strength and fatigue resistance of the reclaimed PC/ABS material.

DETAILED DESCRIPTION

The present application is further described in detail with reference to examples below.

The following are the sources and specifications of some raw materials used according to the present application. The raw materials used in the preparation examples and examples of the present application can be commercially available, including but not limited to the following models and manufacturers of raw materials, and raw materials with the same performance may also be used:

1. recycled PC material: commercially available, having a cantilever notched impact strength of 15-18 kg-cm/cm, a heat deformation temperature of 75-78° C., a bending strength of 23-28 MPa, and a dielectric constant of 3.4-3.5, and recycled from plastic waste from household appliance casings from China Renewable Waste Household Appliances Dismantling Co., Ltd. in Heilongjiang Province;

2. recycled ABS material: commercially available, having a cantilever notched impact strength of 20-23 kg-cm/cm, a heat deformation temperature of 80-85° C., a bending strength of 15-18 MPa, and a dielectric constant of 3.5-3.6, and recycled from plastic waste from household appliance casings from China Renewable Waste Household Appliances Dismantling Co., Ltd. in Heilongjiang Province;

3. hydroquinone bis(diphenyl phosphate): CAS No. 51732-57-1, content: 99.8%;

4. tetraphenylbisphenol A disphosphate: CAS No. 181028-79-5, content: 99%;

5. polydiphenyloxyphosphazene: CAS No. 28212-48-8, content: 98%;

6. styrene-epoxy group copolymer: KS-05, with a density of 1.02-1.08 g/cm3, a melting rate of 22-28 g/10 min, and an epoxy group content of 2-4%;

7. pentaerythritol triallyl ether: CAS No. 1471-17-6, content: 99%;

8. ester gum: CAS No.: 8050-30-4, content: 99%;

9. silicone PC resin: Wanhua Chemical STC3711;

10. SEBS: Kraton G1726;

11. glycidyl methacrylate-styrene-acrylonitrile copolymer: Fine-Blend, SBG-001;

12. styrene-acrylate copolymer: Fine-Blend, HPC-3128;

13. polydimethylsiloxane: Dow Corning, PMX561;

14. polyethylene wax: Honeywell, AC-629A; and 15. styrene-grafted maleic anhydride: maleic anhydride content: 17-18%.

PREPARATION EXAMPLES OF MODIFIED RECYCLED PC/ABS MATERIALS

Preparation Example 1

Preparation Example 1 discloses a modified recycled PC/ABS material, which was prepared by the following steps:

A1, A recycled PC material and a recycled ABS material were crushed separately by means of a pulverizer at a crushing rate of 800 r/min for 40 min; then, a crushed material was sifted to obtain a sifted recycled PC material with a particle size of 0.5-5 mm and a sifted recycled ABS material with a particle size of 0.5-5 mm, with the recycled PC material with a particle size of less than 0.5 mm and the recycled ABS material with a particle size of less than 0.5 mm being removed; after being sifted out, the recycled PC material with a particle size of greater than 5 mm and the recycled ABS material with a particle size of greater than 5 mm need to be crushed and sifted again to meet the particle size requirements.

A2, The sifted recycled PC material with the particle size of 0.5-5 mm and the sifted recycled ABS material with the particle size of 0.5-5 mm were separately acid pickled with an acid pickling agent at a temperature of 20° C. for 30 min, and then washed with water and dried at 70° C. to obtain an acid pickled recycled PC material and an acid pickled recycled ABS material.

A3, 6 kg of the acid pickled recycled PC material, 2.5 kg of the acid pickled recycled ABS material, 1.5 kg of a styrene-epoxy group copolymer, 0.8 kg of pentaerythritol triallyl ether, 0.6 kg of vinyltrimethoxysilane serving as a silane coupling agent and 0.2 kg of ester gum were mixed to obtain a mixture and then subjected to the mixture to melt extrusion by means of a twin-screw extruder at a temperature of 210° C., and then cooled with water, and cut into particles to obtain a modified recycled PC/ABS material.

The acid pickling agent in the step A2 was a commercially available acid pickling agent consisting of 2 wt % of hydrochloric acid, 1 wt % of hydroxyethyl cellulose, 2 wt % of TO-8 and 95 wt % of water.

Preparation Examples 2-3

The difference between Preparation Examples 2-3 and Preparation Example 1 lies in the amounts of raw materials and preparation conditions. See Table 1 below for details.

TABLE 1

| | | | Amounts of raw materials and preparation conditions for Preparation Examples 1-3 | | |
|---|---|---|---|---|---|
| | | | Preparation Examples | | |
| | Items | | Preparation Example 1 | Preparation Example 2 | Preparation Example 3 |
| Step A1 | Crushing rate/r/min | | 800 | 1000 | 1200 |
| | Crushing time/min | | 40 | 50 | 60 |
| | Sifting particle size/mm | | 0.5-5 | 0.5-5 | 0.5-5 |
| Step A2 | Acid pickling time/min | | 30 | 20 | 10 |
| | Acid pickling temperature/° C. | | 20 | 30 | 40 |
| | Source of acid pickling agent | | Commercially available | Commercially available | Commercially available |
| Step A3 | Recycled PC material, | Amount/ kg | 6 | 7 | 8 |
| | Recycled ABS material | Amount/ kg | 2.5 | 2 | 1.5 |
| | Styrene-epoxy group copolymer | Amount/ kg | 1.5 | 2 | 2.5 |
| | Pentaerythritol triallyl ether, | Amount/ kg | 0.8 | 0.6 | 0.4 |
| | Silane coupling agent | Type and amount/ kg | 0.6 kg of vinyltrimethoxysilane | 0.45 kg of γ-glycidoxypropyltrimethoxysilane | 0.3 kg of vinyltrimethoxysilane and 0.45 kg of γ-glycidoxypropyltrimethoxysilane |

TABLE 1-continued

| Amounts of raw materials and preparation conditions for Preparation Examples 1-3 | | | | |
|---|---|---|---|---|
| | | Preparation Examples | | |
| Items | | Preparation Example 1 | Preparation Example 2 | Preparation Example 3 |
| Ester gum | Amount/ kg | 0.2 | 0.35 | 0.5 |
| | Melting temperature/° C. | 210 | 220 | 230 |

Preparation Example 4

Preparation Example 4 is the same as Preparation Example 1 except for the silane coupling agent used. In Preparation Example 4, the silane coupling agent consisted of Si-69 silane coupling agent and γ-glycidoxypropylt-rimethoxysilane, the amount of Si-69 silane coupling agent was 0.55 kg, and the amount of γ-glycidoxypropylt-rimethoxysilane was 0.05 kg.

Preparation Example 5

Preparation Example 5 is the same as Preparation Example 4 except that the amount of Si-69 silane coupling agent was 0.46 kg, and the amount of γ-glycidoxypropylt-rimethoxysilane was 0.14 kg.

Comparative Preparation Example 1

Comparative Preparation Example 4 is the same as Preparation Example 1 except that the styrene-epoxy copolymer was replaced with an equivalent amount of a styrene-maleic anhydride copolymer (model: SMA1000).

Comparative Preparation Example 2

Comparative Preparation Example 2 is the same as Preparation Example 1 except that the pentaerythritol triallyl ether was replaced with an equivalent amount of polyethylene glycol diglycidyl ether.

Comparative Preparation Example 3

Comparative Preparation Example 3 is the same as Preparation Example 1 except that the ester gum was replaced with an equivalent amount of the pentaerythritol triallyl ether.

EXAMPLES

Example 1

Example 1 discloses a fluorine-free flame-retardant reclaimed PC/ABS material, which was prepared by the following steps: 5 kg of the modified recycled PC/ABS material prepared in Preparation Example 1, 2.5 kg of silicon PC resin serving as a reinforcing resin, 1.5 kg of a glycidyl methacrylate-styrene-acrylonitrile copolymer serving as a compatibilizer, 0.4 kg of a flame retardant (consisting of triphenyl phosphate and hexaphenoxycyclotriphosphazene in a weight ratio of 1:1), 0.4 kg of polydimethylsiloxane serving as a lubricant and 0.2 kg of an antioxidant (consisting of antioxidant 1010 and antioxidant 168 in a weight ratio of 1:1) were mixed uniformly to obtain a resulting mixture, and then the resulting mixture was subjected to melt extrusion by means of a twin screw extruder with a screw speed of 200 r/min, where the extrusion temperature in zone 1 was 220° C., the extrusion temperature in zone 2 was 225° C., the extrusion temperature in zone 3 was 230° C., the extrusion temperature in zone 4 was 245° C., the extrusion temperature in zone 5 was 240° C., and the extrusion temperature of a die head was 235° C.; and then water cooling and cutting were performed to obtain the fluorine-free flame-retardant reclaimed PC/ABS material.

Examples 2-3

The difference between Examples 2-3 and Example 1 lies in the amounts of raw materials and preparation conditions. See Table 2 below for details.

TABLE 2

| Amounts of raw materials and preparation conditions for Examples 1-3 | | | | |
|---|---|---|---|---|
| | | Examples | | |
| Items | | Example 1 | Example 2 | Example 3 |
| Modified recycled PC/ABS material | Source | Preparation Example 1 | Preparation Example 2 | Preparation Example 3 |
| | Amount/ kg | 5 | 7.1 | 8.5 |
| Reinforcing resin | Type | Silicon PC resin | Silicon PC resin | Silicon PC resin |
| | Amount/ kg | 2.5 | 1.5 | 0.25 |
| Compatibilizer | Type | Glycidyl methacrylate-styrene-acrylonitrile copolymer | Glydicyl methacrylate-butadiene-styrene copolymer:styrene-grafted maleic anhydride = 1:0.5 | Glycidyl methacrylate-styrene-acrylonitrile copolymer:styrene-grafted maleic anhydride = 1:1 |

TABLE 2-continued

| | | Amounts of raw materials and preparation conditions for Examples 1-3 | | |
| | | Examples | | |
| Items | | Example 1 | Example 2 | Example 3 |
| Flame retardant | Amount/ kg | 1.5 | 0.6 | 0.3 |
| | Type | Triphenyl phosphate:hexaphen- oxycyclotriphosphazene = 1:1 | Tetraphenylbisphenol A disphosphate:hexaphen- oxycyclotriphosphazene = 1:1 | Tetraphenylbisphenol A disphosphate:triphenyl phosphate:hexaphen- oxycyclotriphosphazene = 1:1:2 |
| Lubricant | Amount/ kg | 0.4 | 0.68 | 0.9 |
| | Type | Polydimethylsiloxane | Polyethylene wax | Polydimethylsiloxane |
| | Amount/ kg | 0.4 | 0.06 | 0.02 |
| Antioxidant | Type | Antioxidant 1010:antioxidant 168 = 1:1 | Antioxidant 1010 | Antioxidant 1010:antioxidant 168 = 1:3 |
| | Amount/ kg | 0.2 | 0.06 | 0.03 |
| Screw speed/r/min | | 200 | 300 | 400 |
| Extrusion temperature/° C. | Zone 1 | 220 | 225 | 220 |
| | Zone 2 | 225 | 235 | 230 |
| | Zone 3 | 230 | 240 | 235 |
| | Zone 4 | 245 | 245 | 245 |
| | Zone 5 | 240 | 240 | 235 |
| | Die head | 235 | 235 | 230 |

Examples 4-5

The difference between Examples 4-5 and Example 1 lies in the source of the modified recycled PC/ABS materials. See Table 3 below for details.

TABLE 3

| Sources of the modified recycled PC/ABS materials in Examples 4-5 | |
| Examples | Modified recycled PC/ABS material |
| Example 4 | Preparation Example 4 |
| Example 5 | Preparation Example 5 |

Example 6

Example 6 is the same as Example 5 except for the flame retardant used. In Example 6, the flame retardant consisted of tetraphenylbisphenol A diphosphate, hydroquinone bis(diphenyl phosphate) and polydiphenyloxyphosphazene, the amount of tetraphenylbisphenol A diphosphate was 0.1 kg, the amount of hydroquinone bis(diphenyl phosphate) was 0.15 kg, and the amount of polydiphenyloxyphosphazene was 0.15 kg.

Example 7

Example 7 is the same as Example 6 except that the amount of tetraphenylbisphenol A diphosphate was 0.04 kg, the amount of hydroquinone bis(diphenyl phosphate) was 0.32 kg, and the amount of polydiphenyloxyphosphazene was 0.04 kg.

Example 8

Example 8 is the same as Example 7 except for the reinforcing resin used. In Example 8, the reinforcing resin consisted of silicone PC resin and SEBS, the amount of silicone PC resin was 2.08 kg, and the amount of SEBS was 0.42 kg.

Example 9

Example 9 is the same as Example 8 except that the amount of silicone PC resin was 1.786 kg, and the amount of SEBS was 0.714 kg.

Example 10

Example 10 is the same as Example 8 except for the compatibilizer used. In Example 10, the compatibilizer consisted of the glycidyl methacrylate-styrene-acrylonitrile copolymer and a styrene-acrylate copolymer, the amount of the glycidyl methacrylate-styrene-acrylonitrile copolymer was 0.75 kg, and the amount of the styrene-acrylate copolymer was 0.75 kg.

Example 11

Example 11 is the same as Example 10 except in that the amount of the glycidyl methacrylate-styrene-acrylonitrile copolymer was 0.375 kg, and the amount of the styrene-acrylate copolymer was 1.125 kg.

COMPARATIVE EXAMPLES

Comparative Examples 1-3

The difference between Comparative Examples 1-3 and Example 1 lies in the source of the modified recycled PC/ABS material. See Table 4 below for details.

TABLE 4

| Sources of the modified recycled PC/ABS material in Comparative Examples 1-3 | |
| --- | --- |
| Comparative Examples | Modified recycled PC/ABS material |
| Comparative Example 1 | Comparative Preparation Example 1 |
| Comparative Example 2 | Comparative Preparation Example 2 |
| Comparative Example 3 | Comparative Preparation Example 3 |

Comparative Example 4

Comparative Example 4 is the same as Example 1 except that the flame retardant consisted of magnesium hydroxide and a phosphazene flame retardant, the phosphazene flame retardant was phenoxy cyclotriphosphazene, the amount of magnesium hydroxide was 0.3 kg, and the amount of phenoxy cyclotriphosphazene was 0.1 kg.

Comparative Example 5

Comparative Example 5 is the same as Example 1 except that the flame retardant consisted of an organosilicon flame retardant, an organic phosphorus flame retardant and a phosphazene flame retardant, the organosilicon flame retardant was polymethylphenyl siloxane, the organic phosphorus flame retardant was hydroquinone bis(diphenyl phosphate), and the phosphazene flame retardant was polydiphenyloxyphosphazene, the amount of polymethylphenyl siloxane was 0.2 kg, the molecular weight of polymethylphenyl siloxane was 2500-2700, and the amount of hydroquinone bis(diphenyl phosphate) was 0.1 kg, and the amount of polydiphenyloxyphosphazene was 0.1 kg.

Performance Test

The performance test was performed below on the fluorine-free flame-retardant reclaimed PC/ABS materials prepared in Examples 1-11 and Comparative Examples 1-5. The prepared reclaimed PC/ABS materials mentioned above were baked in an oven at 80° C. for 90 min, and then subjected to injection molding using an injection molding tester at a temperature of 240° C. and then cut into test strips for testing.

1. Impact Strength Test

Referring to the test standard of ASTMD256, the test strips were tested for cantilever notched impact strength (unit: kg-cm/cm), denoted as first impact strength, and the test results were recorded.

2. Fatigue Resistance Test

The test strips were subjected to vibration test for 8 h by means of ultrasonic waves with an ultrasonic frequency of 30 kHz under the condition that the water temperature was 85° C., and then tested for 8 h in a constant temperature and humidity chamber with a temperature of 85° C. and a humidity of 85%. After the test, referring to the test standard of ASTMD256, the test strips were tested for cantilever notched impact strength (unit: kg-cm/cm), denoted as second impact strength, and the test results were recorded.

3. Bending Strength Test

Referring to the test standard of ASTMD790, a bending strength test (unit: MPa) was performed on the test strips, and the test results were recorded.

4. Flame Retardant Rest

Referring to the UL94 vertical combustion test standard, a flame retardancy test was performed on test strips with a thickness of 0.8 mm, and the test results were recorded.

5. Dielectric Constant Test

Test strips were subjected to the dielectric constant test (1 KHz) using a dielectric constant tester (model: ZJD-C), and the test results were recorded.

The following are the performance test data of the fluorine-free flame-retardant reclaimed PC/ABS materials prepared in Examples 1-11 and Comparative Examples 1-5. See Table 5 below for details.

TABLE 5

| | Performance data of Examples 1-11 and Comparative Examples 1-5 | | | | |
| --- | --- | --- | --- | --- | --- |
| | Items | | | | |
| No. | First impact strength | Second impact strength | Bending strength | Flame retardant rating | Dielectric constant |
| Example 1 | 41.2 | 39 | 79.4 | V0 | 2.55 |
| Example 2 | 38.5 | 36.2 | 75.8 | V0 | 2.63 |
| Example 3 | 34.8 | 32.3 | 73 | V0 | 2.71 |
| Example 4 | 42 | 41.4 | 80 | V0 | 2.48 |
| Example 5 | 42.7 | 42 | 79.8 | V0 | 2.5 |
| Example 6 | 44.5 | 43.9 | 81.6 | V0 | 2.45 |
| Example 7 | 44.3 | 43.7 | 81.2 | V0 | 2.41 |
| Example 8 | 46 | 45.5 | 83.5 | V0 | 2.23 |
| Example 9 | 46.3 | 45.8 | 83 | V0 | 2.2 |
| Example 10 | 48 | 47.7 | 85.7 | V0 | 2.15 |
| Example 11 | 48.3 | 48 | 86 | V0 | 2.12 |
| Comparative Example 1 | 29 | 23.5 | 68 | V1 | 3.32 |
| Comparative Example 2 | 30.1 | 25.2 | 69.6 | V1 | 3.15 |
| Comparative Example 3 | 31.2 | 26.6 | 71 | V1 | 3 |
| Comparative Example 4 | 34.6 | 32.1 | 72.7 | V2 | 2.99 |
| Comparative Example 5 | 34.1 | 31.8 | 72.5 | V2 | 2.84 |

Referring to the above data, compared with Example 1, the reclaimed PC/ABS materials prepared in Examples 4-5 have the first impact strength increased by 1.5 kg-cm/cm, the second impact strength after fatigue resistance test increased by 3 kg-cm/cm, and the bending strength slightly improved. This indicates that the combination of the silane coupling agent consisting of the Si-69 silane coupling agent and γ-glycidoxypropyltrimethoxysilane in an optimal amount ratio according to the present application with the styrene-epoxy group copolymer, pentaerythritol triallyl ether and ester gum according to the present application can better improve the impact resistance and fatigue resistance of the reclaimed PC/ABS materials prepared. In addition, compared with Example 1, the dielectric constant of the reclaimed PC/ABS materials prepared in Examples 4-5 is reduced by 0.07. The low dielectric constant indicates that the degree of polarization of the reclaimed PC/ABS materials in an electric field is low, so the movement and the consumption of energy of carriers in a dielectric medium will be correspondingly reduced, resulting in better dielectric loss of the reclaimed PC/ABS materials. Accordingly, the reclaimed PC/ABS materials further have better wave transmission.

Compared with Example 1, the reclaimed PC/ABS materials prepared in Comparative Examples 1-3 have the first impact strength reduced by 7.2 kg-cm/cm, the second impact strength after fatigue resistance test reduced by 15.5 kg-cm/cm, the bending strength reduced by 11.4 MPa, the flame retardant level also decreased from VO to VI, and the dielectric constant increased by 0.65. This may be because Comparative Examples 1-3 did not use the styrene-epoxy group copolymer, the pentaerythritol triallyl ether, the silane coupling agent and the ester gum in combination in an optimal amount ratio. The styrene-epoxy group copolymer, the pentaerythritol triallyl ether, the silane coupling agent and the ester gum can produce a good synergistic effect so that the recycled PC material and the recycled ABS material can be uniformly interwoven and dispersed, improving the impact strength, bending strength and fatigue resistance of the reclaimed PC/ABS materials prepared; moreover, the impurity components and the flame retardant are fully dispersed, and the molecular chain segments have good rigidity and good flexibility. Therefore, the reclaimed PC/ABS materials prepared have good flame retardancy and wave transmission.

Compared with Comparative Examples 4-5, Examples 4-7 used the organic phosphorus flame retardant and the phosphazene flame retardant in combination in an optimal amount ratio according to the present application, which could improve the flame retardancy of the reclaimed PC/ABS materials prepared from V2 and V1 to VO. The impact strength, bending strength, fatigue resistance and wave transmittance of the reclaimed PC/ABS materials prepared in Examples 4-7 were all improved. In Comparative Example 4, since the magnesium hydroxide flame retardant and the phosphazene flame retardant were used in combination as a flame retardant, the mechanical properties of the reclaimed PC/ABS material prepared were reduced and the dielectric constant was significantly improved. In Comparative Example 5, since the organic silicone flame retardant, the organic phosphorus flame retardant and the phosphazene flame retardant were used in combination as a flame retardant, the mechanical properties of the reclaimed PC/ABS material prepared were reduced and the dielectric constant was slightly improved.

Compared with Example 7, Examples 4-7 used the silicone PC resin and the SEBS in combination in an optimal amount ratio according to the present application, which could better improve the impact strength, bending strength, fatigue resistance and wave transmission of the reclaimed PC/ABS materials prepared. This may be because the silicone PC resin and SEBS can further improve the dispersion properties of the flame retardants and the modified recycled PC/ABS materials.

Compared with Example 8, Examples 10 and 11 used the combination of the reinforcing resin with the compatibilizer consisting of the glycidyl methacrylate-styrene-acrylonitrile copolymer and the styrene-acrylate copolymer, which could further improve the impact strength and fatigue resistance of the reclaimed PC/ABS materials prepared and further enhancing the wave transmission.

The specific examples are merely an explanation of the present application and not for limiting the present application. Those skilled in the art may make modifications, without creative contribution, to the examples as needed after reading this specification. Any of the modifications made within the scope of the claims of the present application shall be protected by the Patent Law.

What is claimed is:

1. A fluorine-free flame-retardant reclaimed Polycarbonate/Acrylonitrile Butadiene Styrene (PC/ABS) material, being prepared from the following raw materials in percent by weight:

50%-85% of a modified recycled PC/ABS material,
5%-25% of a reinforcing resin,
3%-15% of a compatibilizer,
4%-9% of a flame retardant,
0.2%-4% of a lubricant, and
0.3%-2% of an antioxidant;
wherein the flame retardant consists of an organic phosphorus flame retardant and a phosphazene flame retardant;
the organic phosphorus flame retardant is a mixture of hydroquinone bis(diphenyl phosphate) and tetraphenylbisphenol A diphosphate, the phosphazene flame retardant is polydiphenyloxyphosphazene, and a weight ratio of the tetraphenylbisphenol A diphosphate to the hydroquinone bis(diphenyl phosphate) to the polydiphenyloxyphosphazene is (1-2):(3-8):(1-3);
the modified recycled PC/ABS material is prepared from the following raw materials in parts by weight:
60-80 parts of a recycled polycarbonate (PC) material,
15-25 parts of a recycled acrylonitrile butadiene styrene (ABS) material,
15-25 parts of a styrene-epoxy group copolymer,
4-8 parts of pentaerythritol triallyl ether,
3-6 parts of a silane coupling agent, and
2-5 parts of ester gum;
wherein the silane coupling agent consists of bis[3-(triethoxysilyl)propyl] tetrasulfide and γ-glycidoxypropyltrimethoxysilane in a weight ratio of 1:(0.1-0.3);
the modified recycled PC/ABS material is prepared by the following steps:
A1, separately crushing the recycled PC material and the recycled ABS material, and sifting out the recycled PC material with a particle size of 0.5-5 mm to obtain a sifted recycled PC material and the recycled ABS material with a particle size of 0.5-5 mm to obtain a sifted recycled ABS material
A2, performing acid pickling, water washing and drying on the sifted recycled PC material and the sifted recycled ABS material separately to obtain an acid pickled recycled PC material and an acid pickled recycled ABS material; and
A3, mixing the acid pickled recycled PC material, the acid pickled recycled ABS material, the styrene-epoxy group copolymer, the pentaerythritol triallyl ether, the silane coupling agent and the ester gum to obtain a mixture and performing melt extrusion, cooling, and cutting on the mixture to obtain the modified recycled PC/ABS material;
wherein the reinforcing resin consists of silicone PC resin and Styrene-Ethylene-Butylene-Styrene (SEBS) in a weight ratio of 1:(0.2-0.4).

2. The fluorine-free flame-retardant reclaimed PC/ABS material according to claim 1, wherein the compatibilizer consists of a glycidyl methacrylate-styrene-acrylonitrile copolymer and a styrene-acrylate copolymer in a weight ratio of 1:(1-3).

3. The fluorine-free flame-retardant reclaimed PC/ABS material according to claim 1, wherein the lubricant is at least one selected from a group consisting of: polydimethylsiloxane, silicone powder, paraffin wax, polyethylene wax, calcium stearate, zinc stearate, stearic acid amide and N, N-ethylene bisstearate amide.

4. The fluorine-free flame-retardant reclaimed PC/ABS material according to claim 1, wherein the antioxidant is at least one of pentaerythritol tetrakis[3,5-di-tert-butyl-4-hydroxyhydrocinnamate] or tris(2,4-di-tert-butylphenyl) phosphite.

5. A method for preparing the fluorine-free flame-retardant reclaimed PC/ABS material according to claim 1, comprising the following steps:

mixing the modified recycled PC/ABS material, the reinforcing resin, the compatibilizer, the flame retardant, the lubricant and the antioxidant uniformly to obtain a resulting mixture, and performing the melt extrusion, cooling, and cutting on the resulting mixture to prepare the fluorine-free flame-retardant reclaimed PC/ABS material.

* * * * *